United States Patent [19]
Lin

[11] Patent Number: 5,384,149
[45] Date of Patent: Jan. 24, 1995

[54] INTEGRATED PROCESS FOR PRODUCING MEAT PROTEIN, BROTH, MYOGLOBIN PIGMENT, FAT AND BONE MEAL

[75] Inventor: Rudy Lin, Naperville, Ill.

[73] Assignee: Armour Swift-Eckrich, Downers Grove, Ill.

[21] Appl. No.: 205,514

[22] Filed: Mar. 2, 1994

[51] Int. Cl.⁶ .................. A23L 1/312; A23L 1/313
[52] U.S. Cl. .................. 426/646; 426/417; 426/480; 426/647; 426/657
[58] Field of Search .............. 426/264, 266, 641, 646, 426/657, 417, 480, 518, 540, 647, 652; 530/412, 418, 419, 420; 554/175

[56] References Cited

U.S. PATENT DOCUMENTS

| Re. 32,060 | 12/1985 | McFarland | 426/55 |
|---|---|---|---|
| 3,020,160 | 2/1962 | Downing et al. | 426/480 X |
| 3,028,243 | 4/1962 | Robertson et al. | |
| 3,078,165 | 2/1963 | Alberts | 426/480 |
| 3,539,357 | 11/1970 | Appleman | 426/657 |
| 3,887,717 | 6/1975 | Pfeiffer et al. | 426/264 |
| 4,163,804 | 8/1979 | Meyer et al. | 426/315 |
| 4,176,199 | 11/1979 | Vollmer et al. | 426/59 |
| 4,350,624 | 9/1982 | Herubel | 426/657 |
| 4,361,590 | 11/1982 | Wojcik | 426/480 |
| 4,389,423 | 6/1983 | Madsen | 426/480 X |
| 4,402,873 | 9/1983 | Vollmer et al. | 426/59 |
| 4,406,831 | 9/1983 | Atteck | 426/657 |
| 4,427,583 | 1/1984 | England et al. | 426/657 |
| 4,565,709 | 1/1986 | Berge et al. | 426/480 X |
| 4,619,789 | 10/1986 | Strop et al. | 260/412.6 |
| 4,966,733 | 10/1990 | Fernando et al. | 260/412.6 |
| 4,976,973 | 12/1990 | Shirakawa et al. | 426/7 |
| 5,141,763 | 8/1992 | Hansen et al. | 426/464 |
| 5,230,915 | 7/1993 | Shadhidi et al. | 426/540 X |

FOREIGN PATENT DOCUMENTS

| 669938 | 9/1963 | Canada | 426/264 |
|---|---|---|---|
| 2258239 | 2/1993 | United Kingdom | |

Primary Examiner—Arthur L. Corbin
Attorney, Agent, or Firm—Pretty, Schroeder, Brueggemann & Clark

[57] ABSTRACT

In accordance with the present invention, there is provided a method for simultaneously producing: natural muscle protein having very low fat and cholesterol content; stabilized myoglobin pigment; broth with superior gelling, emulsifying and film forming properties; high quality animal fat; and bone meal with consistent calcium and phosphate content. The above products are produced from comminuted animal carcass by-products which are divided into a solid-phase fraction and a solution-phase fraction. The broth, fat and bone meal products are prepared from the solid-phase fraction, and the protein and pigment products are prepared from the solution-phase fraction.

16 Claims, 3 Drawing Sheets

INTEGRATED PROCESS FOR PRODUCING MEAT PROTEIN, BROTH, MYOGLOBIN PIGMENT, FAT AND BONE MEAL

FIELD OF THE INVENTION

The present invention relates to methods of treating animal carcass by-products so as to simultaneously produce: natural muscle protein having very low fat and cholesterol content; stabilized myoglobin pigment; broth with superior gelling, emulsifying and film forming properties; high quality animal fat; and bone meal with consistent calcium and phosphate content.

BACKGROUND OF THE INVENTION

In beef, poultry and turkey processing, the boning of animal carcasses generates bone by-products. The resulting bone by-products obtained from the boning process contain adhering fatty tissue and remnants of meat, and also a substantial content of high quality nitrogenous substances and lipids which originate from the bone content. Such materials are useful as high quality constituents for human and animal nutrition. Even if the meat is thoroughly removed manually from the bones, there still remains, for example on vertebra bones of cattle and pigs, up to 6% or more of meat, of which approximately 30% is connective tissue and about 15 to 25% is fat. Turkey and chicken bone by-products containing attached meat and skin can range from 60 to 72% of the chicken or turkey's green weight. As a rule, this part of the meat, together with the fat and the remaining protein and nitrogenous substances in bones, is lost as far as the manufacture of meat products useful for human and agricultural consumption. These by-products also pose a significant waste treatment and sanitary problem for the food processing industry.

Various animal carcass by-products resulting from a boning process have been treated in the prior art to produce cattle feed, fertilizer, meaty-flavored broth, and the like. These prior art procedures utilize urea, special enzymes, starch, fat solvents, acid treatments, and two-stage treatments among others. Other procedures involve treatment of bones to provide gelatin using soluble salts and special enzymes without extracting protein as an end product (see, U.S. Pat. No. 3,634,191).

These prior art procedures for the independent production of meat proteins, edible fat, broth and bone meal from the animal carcass by-products of processed beef, poultry and turkey are not completely satisfactory to realize the full commercial value of the starting materials. In view of the increasing shortage of animal protein, this loss of nutritionally valuable protein is a serious disadvantage. There continues to be a need for improved commercial processes to more efficiently recover the components of bone by-products or under-valued meat products, and to convert such materials into higher valued functional products.

OBJECTS OF THE INVENTION

It is therefor an object of the present invention to develop an integrated process to recover multiple components of bone by-products and retain or maximize their functionality for food applications.

It is another object of the present invention to develop a process that is flexible enough to treat a variety of animal carcass by-products, such as undervalued meat, and process them into higher value components for food application.

It is yet another object of the present invention to develop a flexible process for the removal of pigment from the dark meats of poultry and turkey to upgrade the meat value thereof.

It is a further object of the invention to produce pure meat muscle-derived functional protein having low fat and cholesterol content useful for food product development.

It is still another object of the invention to provide a meat-based product having low fat and cholesterol content employing the muscle-derived functional protein produced as described herein.

These and other objects of the invention will become apparent to those of skill in the art upon review of the specification and appended claims.

BRIEF DESCRIPTION OF THE INVENTION

Figure 1:
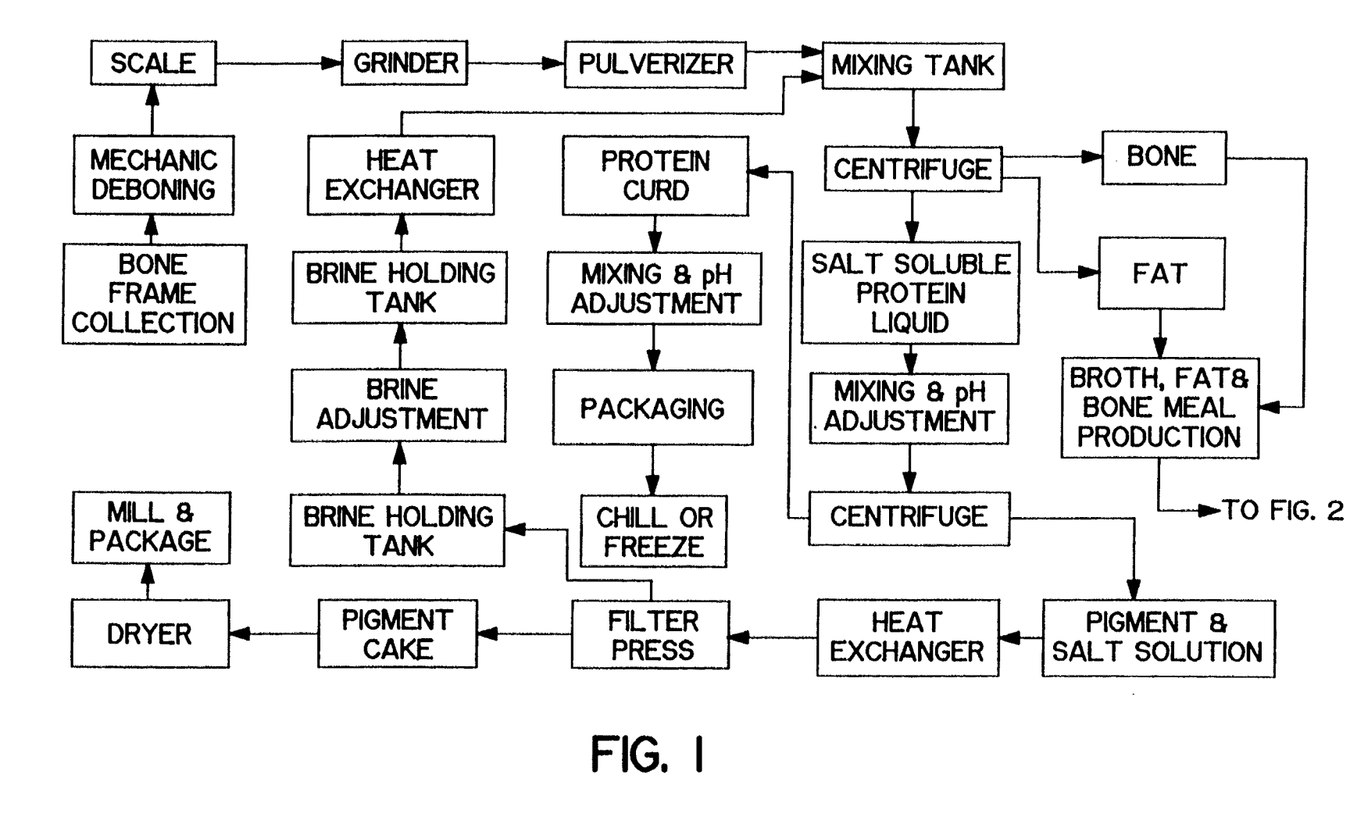
FIG. 1 shows a partial flow-chart of one embodiment of the invention method. Bone, connective tissue and fat are collected and further processed as illustrated in FIG. 2.
Figure 2:
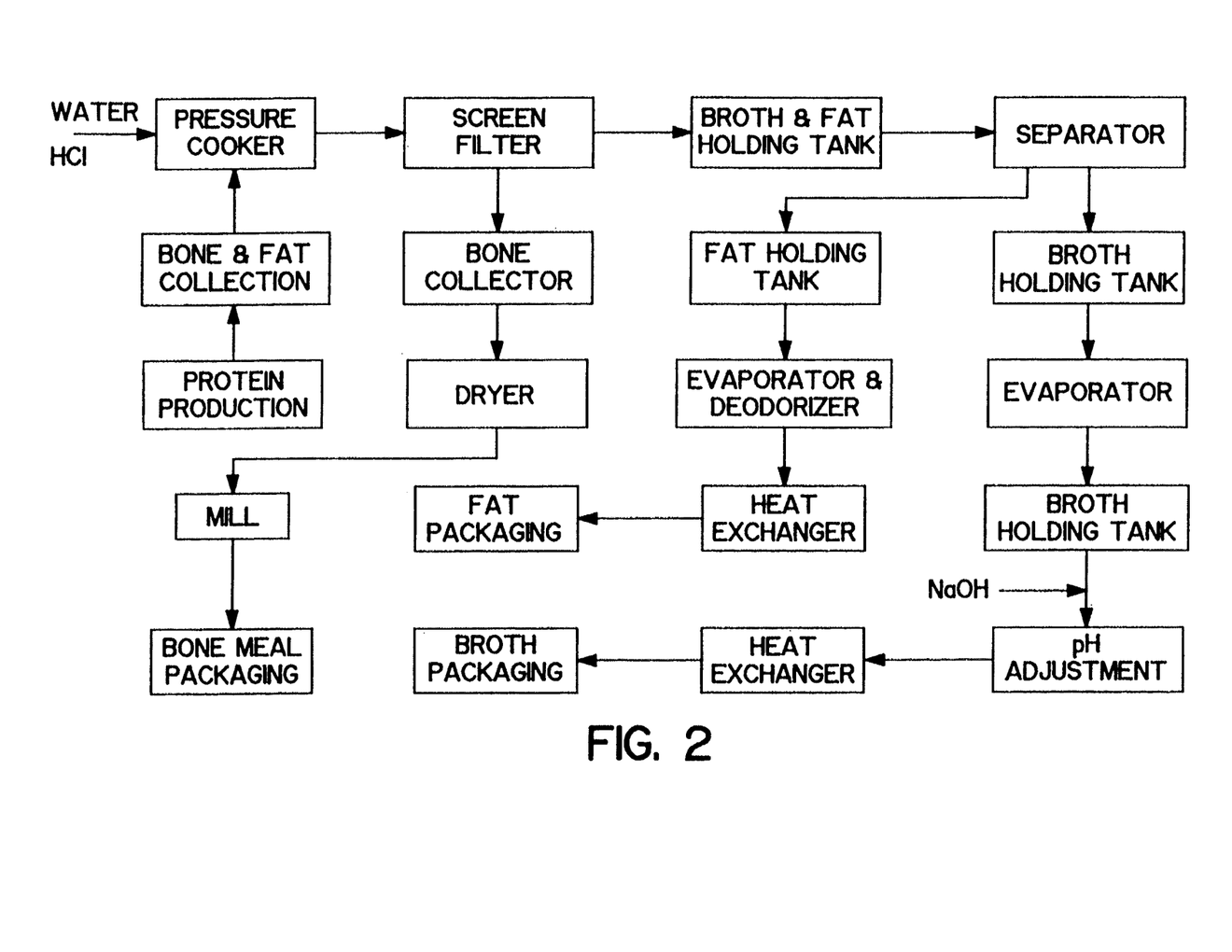
FIG. 2 shows the continuation of the flow-chart from FIG. 1.

In accordance with the present invention, an integrated method is provided for producing, from animal bone by-products (e.g., beef, pork, poultry, and turkey), (1) natural meat muscle protein with very low fat and cholesterol content, (2) stabilized myoglobin pigment, (3) broth with desirable gelling, emulsifying and film forming properties, (4) high quality animal fat, and (5) bone meal with consistent calcium and phosphate content (See FIGS. 1 and 2). Until now, no procedure existed for simply and economically extracting from animal carcass by-products, without waste, as many as five edible products.

Briefly, animal carcass by-products are collected in a sanitary manner and comminuted. Comminuted by-products are mixed with water and salt at a predetermined ionic strength to dissolve salt soluble proteins. The resulting liquid fraction containing the dissolved salt soluble protein is separated from fat and other tissues that are not soluble in the salt solution. The protein in this liquid fraction is precipitated by adjusting the pH to the isoelectric pH. Protein curd is further separated from the liquid. Alkali is then added to the separated protein curd and mixed thoroughly to achieve a desirable pH. This adjustment of pH renatures the salt soluble proteins, thereby restoring their functionality.

The resulting protein has very low fat or cholesterol content. It is possible to achieve substantially no fat and substantially no cholesterol in the meat muscle protein composition, by repeating the dissolving and precipitating processes several times. The resulting protein is also substantially free of virtually all the pigment present in the starting meat muscle. In addition, the invention protein separation process can be used to remove the pigment from dark meat of beef, poultry or turkey, thereby producing white meat. The functional protein produced by the invention process can be used to replace meat in the formulation of processed meat, turkey and chicken products. It can also be added to food product formulations to increase cook and chill yield, and to improve texture. The protein can also be used to produce an engineered meat protein based product with very low fat and cholesterol.

The filtrate resulting from the above-described separation of the salt soluble protein has a red color, indicating the presence of the meat pigment, myoglobin. The myoglobin in the filtrate is oxidized, isolated by filtration, dried and milled. The isolated myoglobin meat pigment is useful in food formulations to alter the color of the final product.

The non-soluble materials separated from the above-described protein separation step are cooked under pressure to produce a broth with high gelling and emulsifying properties. Acid and/or alkali may optionally be added to increase the broth yield and shorten the time needed for the process. After pressure cooking, liquid is separated from solid with a screen filter or other similar apparatus. The bone is dried and milled to a desirable mesh size. This bone meal can be used as a human nutritional supplement or as feed additives in agriculture. The liquid separated from the screen filter is pumped into a centrifuge to separate the broth from the fat. Skimming the fat in a holding tank is also an option. The isolated fat is further refined by dewatering and deodorizing. The isolated broth from the centrifuge is optionally concentrated to achieve a desirable solid content. The resulting broth has a high collagen content and excellent gelling, film forming and emulsifying properties.

Thus, the above-described methods provide a high quality, low fat, low cholesterol meat muscle protein useful for replacing meat in food formulations, thereby reducing or eliminating cholesterol and fat in the meat, turkey and poultry products. The invention method also provides a broth with a high gelatin content for use as gelling agent for food formulation. The invention method also provides a means for reducing or removing red meat pigment from the dark meat muscle of meat and animal by-products. The invention method also provides a stabilized meat pigment useful for improving food product color.

Figure 3:
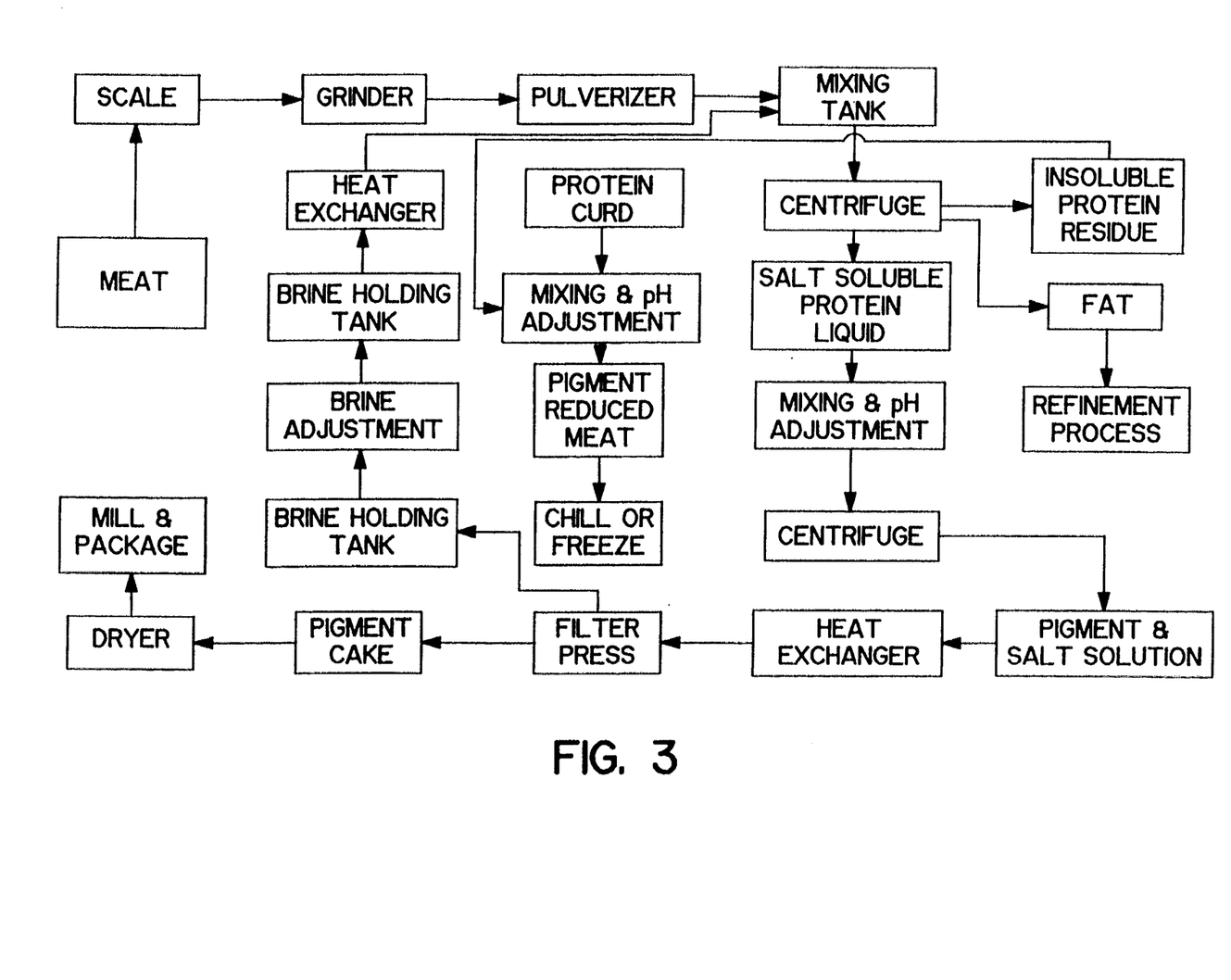
FIG. 3 depicts another embodiment of the invention method for processing boneless turkey meat (e.g., raw mechanically deboned turkey meat or ground turkey dark meat).

In another embodiment of the present invention, an integrated method is provided for producing, from boneless turkey meat by-products, (1) natural turkey meat protein with very low fat and cholesterol content, and (2) stabilized myoglobin pigment (See FIG. 3). Mechanically deboned turkey meat or ground turkey dark meat (i.e., boneless turkey meat by-product) is mixed with a salt solution. The mixture is centrifuged to separate each of the fat, liquid with salt soluble protein, and the solid phase salt insoluble protein residue, from each other. The pH of the salt soluble protein liquid fraction is adjusted to precipitate the protein. The precipitated protein is separated from the myoglobin-containing salt solution. Alkali is added to the salt soluble protein to raise the pH. The salt soluble protein is added to the solid phase of salt-insoluble protein residue, mixed, chilled and either used immediately or packaged for later use in the formulation of food products. The myoglobin containing salt solution is subjected to the same treatment as depicted in FIG. 1 to recover the myoglobin and brine solution.

In accordance with another embodiment of the present invention, there is provided a meat muscle protein composition characterized by having substantially no fat and substantially no cholesterol. The invention meat muscle protein composition is useful for preparing low-fat food products.

In accordance with yet another embodiment of the present invention, there are provided food products comprising the invention meat muscle protein compositions described herein.

DETAILED DESCRIPTION OF THE INVENTION

In accordance with the present invention, there is provided a method of making functional and natural meat muscle protein, meat muscle pigment, broth, animal fat and bone meal from animal carcass by-products (see FIGS. 1 and 2), said method comprising:
  a) comminuting animal carcass by-products under conditions sufficient to break meat muscle cell membranes, thereby releasing meat muscle protein;
  b) contacting the comminuted animal carcass by-products with saline having an ionic strength between about 0.1 to about 0.9, under conditions suitable to form a solid-phase fraction and a solution-phase fraction, wherein said solid-phase fraction contains bone, fat, fat soluble organic materials, salt insoluble proteins, and connective tissue and said solution-phase fraction contains soluble meat muscle protein and myoglobin pigment;
  c) separating the solid-phase fraction of step (b) from the solution-phase fraction of step (b);
  d) adjusting the pH of the solution-phase fraction to the isoelectric point of said meat muscle protein so as to precipitate the soluble meat muscle protein in the solution-phase fraction of step (c), thereby forming a meat muscle protein curd fraction, and a solution-phase fraction containing myoglobin pigment;
  e) separating the meat muscle protein curd fraction of step (d) from the solution-phase myoglobin pigment fraction;
  f) adjusting the pH of the solid protein curd fraction of step (e) to a pH selected from between about 5.5 to 7.0, and adding a nitrogen oxide generating compound to the solution-phase pigment fraction of step (e), thereby denaturing the myoglobin pigment in the solution-phase myoglobin pigment fraction;
  g) filtering the denatured myoglobin pigment of step (f) to form a meat myoglobin pigment cake and a residual saline solution;
  h) drying and milling the meat pigment cake of step (g) to form a powder, and recycling the residual saline solution of step (g) to step (b);
  i) cooking the solid-phase fraction of step (c) under conditions sufficient to convert substantially all connective tissue in said fraction into soluble collagen, thereby forming a broth-fat fraction and a bone-residue fraction;
  j) drying and milling the bone-residue fraction of step (i) to form a bone-meal;
  k) separating the broth-fat fraction of step (i) into fat and broth fractions;
  l) refining the fat of step (k) to produce a fat-product;
  m) concentrating the broth of step (k) to form a broth-product.

Step a) of the invention method contemplates comminuting animal carcass by-products under conditions sufficient to break meat muscle cell membranes, thereby releasing meat muscle protein.

As used herein, "animal carcass by-products" refers to meat-containing bone by-products, preferably raw (i.e., uncooked), obtained from either whole or mechanically de-boned animals, e.g., pork, beef, lamb, poultry, turkey by-products, and the like. These raw starting materials can also be derived from parts of a carcass, such as drum sticks and wings of chicken and turkey, or the whole carcass, such as hens. Animal carcass by-products typically contain a mixture of bone and meat.

In a preferred embodiment of the present invention, the animal carcass by-product starting materials are obtained from mechanically de-boned turkeys. The turkey-derived animal carcass starting material is typically comprised of about 50 to 60% by weight meat, with the balance being bone. The raw animal carcass starting material is collected under sanitary conditions, with the temperature maintained under 50° F. if the carcass is to be processed within two hours. In the event that the animal carcass by-products cannot be processed within 2 hours, the animal carcass by-products are frozen until ready for processing. This is highly desirable to retain the wholesomeness, safety, flavor and functionality of the final product.

As used herein, "comminuting" refers to the well known process of breaking up the animal carcass by-product starting materials into relatively small fragments. The comminution step (i.e., pulverization) can be carried out employing means well known in the art, e.g., a grinder, pulverizer or other milling apparatus (colloid mill), or a mixer or reactor equipped with a mixing worm, and the like. Preferably, the carcass by-product is ground and mixed with water at a ratio of about 1:2 (w:w).

In a preferred embodiment, the animal carcass by-products are pulverized in a mill, such as a colloid mill, or pulverizer. Pulverization reduces the particle size of the animal carcass by-product starting materials and breaks the cell membranes of muscle cells that are attached to the bones. The act of breaking the cell membranes exposes the protein to the saline solution and increases the interface area for the extraction of protein. Pulverizing the starting material is preferable for obtaining a high yield of protein extraction, although it is not absolutely necessary for the salt soluble protein extraction described herein.

Step b) of the invention method contemplates contacting the comminuted animal carcass by-products with saline having an ionic strength between about 0.1 to 0.9, preferably 0.17 to 0.86, under conditions suitable to form a solid-phase fraction and a solution-phase fraction, wherein the solid-phase fraction contains bone, fat, fat soluble organic materials, salt insoluble protein and connective tissue, and the solution-phase fraction contains soluble meat muscle protein and myoglobin pigment.

As used herein, the phrase "soluble meat muscle protein" refers to meat muscle proteins that are soluble in an aqueous salt solution, preferably a salt solution of at least about 1–5% by weight salt concentration, which correlates to an ionic strength of about 0.1–0.9. The phrase "myoglobin pigment" refers to the brownish-red pigment that is contained in the "dark meat" of a variety of animals, e.g., beef, poultry and fish.

As used herein, "conditions suitable to form a solid-phase fraction and a solution-phase fraction" refers to the addition of salt into a contacting means (e.g., mixer) to a final concentration of about 1% to about 5% preferably about 2% to about 3%, with about 2% being especially preferred (w/w). The contacting step serves to extract salt soluble meat proteins and myoglobin from the animal carcass. The contacting step can either be accomplished slowly or by vigorous mixing, e.g., employing a high shearing mixer. More of the salt soluble protein is extracted if the contacting step employs vigorous mixing for an extended period of time. The extraction step is usually instantaneous if there is enough salt (e.g., at least 1%) in the solution and the muscle cell membrane has been broken. Those of skill in the art will recognize that the time required for protein extraction will vary depending on the sheer pressure and salt concentration utilized.

The extracted protein increases the viscosity of the saline solution. Extraction of salt soluble proteins can be monitored visually to determine the extent of meat muscle remaining attached to the bones during the mixing. The temperature during the extraction step is preferably kept at or below 40° F.; however the extraction will still be complete at higher temperatures, so long as the temperature does not exceed the denaturation temperature (about 110° F.) of the muscle proteins.

Exemplary salts that may be employed for protein extraction include sodium and potassium chlorides, and sodium and potassium salts of such acids as phosphoric acid, and its derivatives, lactic acid, citric acid, adipic acid, ascorbic acid, tartaric acid, acetic acid, malic acid, succinic acid, glucono delta-lactone, benzoic acid, erythorbic acid, propionic acid, sorbic acid, and the like.

Step c) of the invention method contemplates separating the solid-phase fraction of step (b) from the solution-phase fraction of step (b).

With respect to the separation contemplated by step (c), the solution-phase fraction (containing soluble meat muscle protein and myoglobin pigment) can be separated from the solid-phase fraction by a horizontal three-phase centrifuge, such as one commercially available from Alfa Laval Co. (Greenwood, Ind.). The centrifuge can be operated in the range of about 1,000–10,000 g-force, preferably in the range of about 1,500–3,000, with a g-force of 3,000 being especially preferred. The feed rate of the animal by-product starting material is such that the residence time of the carcass by-products being separated is typically about 30 minutes, although this rate may be varied accordingly by those of skill in the art. The separation can also be accomplished by other well-known separation devices, e.g., a combination of a screen filter (such as the one produced by Sweco, Florence, Ky.), and a two phase centrifuge, and the like. It is preferable to keep the temperature during screening close to 32° F. to facilitate the separation of fat from the protein solution.

In one embodiment of the invention method, the residual fat in the meat muscle protein-containing solution-phase fraction can be further reduced such that the meat muscle protein in the solution-phase fraction has substantially no fat, i.e., a fat content of less than about 1%. This fat reduction can be accomplished employing an appropriate filtration system, such as the microfiltration system available from Separation Technology (Clemenson, S.C.) or other filtration technology well known in the art. This can also be accomplished employing a two phase centrifuge wherein the temperature of the meat muscle protein-containing solution-phase fraction can be increased up to about 110° F., so long as the protein is not denatured.

When filtering using a stainless filtration tube made by the sintering process, the protein solution is preferably kept near the freezing point to solidify the fat and break the emulsion. The protein solution is circulated through the sintered stainless filtration tube with a controlled pressure, flux, and pore size to allow protein to pass through the tube. Fat is retained and concentrated in the tube due to its hydrophobic property. The concentrated fat solution can be added to the solid-phase fraction of step (b) for further processing.

Step d) of the invention method contemplates adjusting the pH of the solution-phase fraction to the isoelectric point of the meat muscle protein so as to precipitate the soluble meat muscle protein in the solution-phase fraction of step (c), thereby forming a meat muscle protein curd fraction, and a solution-phase fraction containing myoglobin pigment.

With respect to the precipitation contemplated by step (d), the protein solution is pumped into a mixing tank and the pH is adjusted to the isoelectric point. Since the solution consists of several proteins, the isoelectric pH may be varied for the precipitation of different proteins. The different meat muscle proteins contained in the solution-phase fraction of step (c) are collectively referred to herein as "protein". After the protein is precipitated in the form of a protein curd, the solution is pumped to a suitable means for separation, preferably a centrifuge, and the protein is separated from the liquid.

The isoelectric pH employed herein can be a single value (e.g., pH=5.2) or a range of pH values, such as from about pH 4.0 up to about pH 6.0, based on the protein in the solution. Exemplary acids for use in adjusting the pH to the isoelectric point include hydrochloric acid, phosphoric acid, lactic acid, citric acid, ascorbic acid, tartaric acid, acetic acid, malic acid, succinic acid, erythorbic acid, propionic acid, sorbic acid, and the like.

Step e) of the invention method contemplates separating the meat muscle protein curd fraction of step (d) from the solution-phase myoglobin pigment fraction.

The separation of solution-phase myoglobin pigment fraction from the meat muscle protein curd fraction can be accomplished by well known methods, such as a filter press and membrane filter or by centrifugation. For example, when employing a centrifuge, the protein curd is discharged as a solid phase from the centrifuge and the saline solution (which also consists of myoglobin pigment from muscle) is discharged as a liquid phase.

Step f) of the invention method contemplates adjusting the pH of the protein curd fraction of step (e) to a pH selected from between about 5.5 to 7.0 to form a meat muscle protein product, and adding a nitrogen oxide generating compound to the solution-phase myoglobin pigment fraction of step (e), thereby denaturing the myoglobin pigment in the solution-phase myoglobin pigment fraction.

The pH of the protein curd fraction separated by the centrifuge is adjusted away from the isoelectric pH to between about 5.5 to 7.0, preferably to a pH of about 6.2. This procedure redissolves the protein in the saline solution, and significantly increases the viscosity of the saline solution. During this step vigorous mixing is preferred to ensure a protein product with uniform pH and consistency. The pH of the protein curd can be adjusted, for example, with bases such as sodium hydroxide, potassium hydroxide, ammonium hydroxide, magnesium hydroxide, calcium hydroxide, and the like.

The meat-derived protein can be used as is, or frozen and later thawed for use as a meat protein source. The protein obtained from the invention method maintains all of the functional properties of native salt soluble proteins. The protein is very low in fat and cholesterol content. For example, the meat muscle protein produced by the invention methods has a fat content in the range of 0 up to about 1% and a cholesterol content in the rage of 0 up to about 10 mg per 100 grams of protein curd. The protein can be used in processed meat, poultry and turkey formulations to improve the emulsion stability, water binding, cook and chill yield, fat emulsification, and gelling properties of these products. Use of this protein as a meat substitute also decreases the cost of food formulations and provides nutritional value without the disadvantage of animal fat and cholesterol.

The pigment contained in the solution fraction can be treated by numerous methods well known for denaturing (oxidizing) myoglobin, such as by heating and/or by adding nitrite (such as sodium nitrite, and the like), nitrates or injecting nitrogen oxide into the solution to convert the pigment to nitroso-myoglobin. A combination of heating and adding nitrite, nitrate or nitrogen oxide treatment to denature the myoglobin pigment is preferably employed. The myoglobin containing solution can be used directly for processing food products (such as, for example, processed meat and poultry products), or the myoglobin can be further isolated in the form of a meat pigment cake. The oxidized nitroso-myoglobin obtained has the desirable property of being stabilized with respect to color (i.e., not being susceptible to color change).

In a preferred embodiment, the myoglobin pigment is denatured by adjusting the pH to about 7.0. Sodium nitrite is then added, preferably to a level of not more than about 52 ppm. The solution is then mixed, heated to a temperature of at least 158° F. or higher, and filtered through a filter press. As a result, the residual saline solution is pasteurized.

Step g) of the invention method contemplates filtering the denatured myoglobin pigment of step (f) to form a meat myoglobin pigment cake and a residual saline solution.

This filtration step can be accomplished employing a filter press or any similar filtration apparatus well known in the art. The filtrate from the solution-phase pigment fraction is a pasteurized salt (brine) solution, which is recycled back to the beginning of the protein extraction process (i.e., step b), after adjusting the saline solution to a salt concentration of about 1–5%, preferably 2% (i.e., an ionic strength of about 0.1–0.9). This can be accomplished by adding alkali, such as sodium hydroxide, to adjust the pH of the residual saline solution of step (g) to 7.0.

Step h) of the invention method contemplates drying and milling the meat pigment cake of step (g) to form a powder, and recycling the residual saline solution of step (g) to step (b).

Methods of drying and milling the meat myoglobin pigment cake are well known in the art. The filtered meat myoglobin pigment (in the form of a pink protein solid) is dried using a drum drier or other available means, such as vacuum pan drying and spray drying, and is useful thereafter as meat pigment, such as for adding to soy protein to increase its cure meat pigment color.

Step i) of the invention method contemplates cooking the solid-phase fraction of step (c) under conditions sufficient to convert substantially all connective tissue in said fraction into soluble collagen, thereby forming a broth-fat fraction and a bone-residue fraction.

The solid-phase fraction of step (c) is conveyed to a pressurized cooker. Water is added to a pressure cooker in about the same amount of weight as bones, connective tissue and fat of the solid-phase fraction. The amount of water added can optionally be increased to facilitate the conversion of connective tissue into gelatin. Acid, such as hydrochloric acid, is preferably added to the cooker to reduce the pH to about 4.2 or lower. The acidic environment accelerates the swelling and hydrolysis of connective tissue and releases it from bone. Without the addition of acid, the bone connective tissue hydrolyzes more slowly, thereby requiring a longer time period of pressurized cooking to obtain the same quality of broth. The pressure cooker is set to cook at about 250° F. and about 25 psi (pounds per square inch) until substantially all the connective tissue is converted into collagen, which typically requires about 10 to 15 minutes. The boiling temperature of the broth is inversely proportional to the pressure set up for cooking. After most of the connective tissue or gristle is hydrolyzed to a gelatinous liquid form and substantially no meat tissue remains attached to the bones, the cooking process is deemed to be complete. Pressure in the cooker is released and the temperature reduced to 212° F. or below, but not so low as to allow formation of a gel.

When optionally included in the pressurized cooking step described above, suitable acids include, e.g., hydrochloric acid, phosphoric acid, lactic acid, citric acid, ascorbic acid, tartaric acid, acetic acid, malic acid, succinic acid, sorbic acid, propionic acid, erythorbic acid, and the like.

The bone-residue fraction of step (i) is separated from the broth-fat fraction. To accomplish the separation, the contents from the pressurized cooker are pumped to a screen rotary filter and the bone-residue is separated from the liquid broth-fat fraction that includes, for example, turkey broth and turkey fat. This separation can also be accomplished using other devices, such as a three phase centrifuge (e.g., commercially available from Alfa Laval Co., Greenwood, Ind.). If acid is optionally added in the pressure cooker, the broth will typically have a pH of about 5.0 to 5.5 after separation from the bone residues.

Step j) of the invention method contemplates drying and milling the bone-residue fraction of step (i) to form a bone-meal.

The bone-residue fraction produced by step (i) has very little meat and fat. It is collected, dried by air or any other well-known means, such as a tunnel dryer or a fluidized bed dryer. The dried bone-residue is then milled to a desirable particle size employing suitable means, e.g., by colloid mill, hammer mill, or the like. This bone meal has a high content of calcium and phosphate. It is useful as calcium and phosphate supplement for food and/or feed.

Step k) of the invention method contemplates separating the broth-fat fraction of step (i) into fat and broth fractions.

This separation step can be carried out by centrifugation or other decanting methods, e.g., those employing gravity, as are well known in the art. For example, the liquid from the rotary screen filter described above is discharged into a holding tank that maintains the temperature of the broth above the gelling temperature. This liquid is then pumped to a two-phase centrifuge. Fat is discharged from the centrifuge as the light phase. Broth is discharged into a holding tank from the two-phase centrifuge as the heavy phase.

Step l) of the invention method contemplates refining the fat of step (k) to produce a fat-product.

The fat of step (k) is refined by, employing such processes as dewatering, deodorizing, filtering and chilling. Methods of dewatering and deodorizing fat are well known in the art (see, e.g., Swern, Daniel (1982), *Bailey's Industrial Oil and Fat Products*, John Wiley and Sons, New York, N.Y., incorporated herein by reference). For example, the fat of step (k) may be cooked under vacuum at boiling temperature approximately 1 hour, and then filtered through clay materials. The chilling can be accomplished by well known methods, such as using a heat exchanger. The resulting fat-product has a bland flavor and a substantially low peroxide value (e.g., about 0–1 miliequivalents peroxide/kg fat).

Step m) of the invention method contemplates concentrating the broth of step (k) to form a broth-product.

The broth of step (k) can be used as is or concentrated further to a desirable solid content by a variety of means, e.g., employing a vacuum concentrator, such as a pan evaporator (e.g., pan evaporator manufactured by Lee Industry of Phillipsburg, Pa.). After concentration, the broth is neutralized to desirable pH, such as about 6.0 to about 7.0, chilled to a temperature of about 70° F. or below, and packaged. The broth, preferably turkey broth, produced by this method has a bland and clean flavor. Preferably, the broth produced by the invention method gels at room temperature (i.e., about 25° C.) with 3% solid content. When emulsified with soybean oil, the broth is capable of forming a stable emulsion.

In accordance with another embodiment of the present invention, an integrated method is provided for producing, from boneless turkey meat by-products (1) natural turkey meat protein with low fat and cholesterol content, and (2) stabilized myoglobin pigment (See FIG. 3), said method comprising:

a) contacting turkey meat by-products with saline having an ionic strength between about 0.1 to 0.9, under conditions suitable to form a solid-phase fraction and a solution-phase fraction, wherein said solid-phase fraction contains insoluble turkey meat muscle protein, and wherein said solution-phase fraction contains soluble turkey meat muscle protein and myoglobin pigment;

b) separating the solid-phase fraction of step (a) from the solution-phase fraction of step (a);

c) adjusting the pH of the solution-phase fraction to the isoelectric point of the meat muscle protein so as to precipitate the soluble meat muscle protein in the solution-phase fraction of step (b), thereby forming a meat muscle protein curd fraction, and a solution-phase fraction containing myoglobin pigment;

d) separating the meat muscle protein curd fraction of step (c) from the solution-phase myoglobin pigment fraction;

e) adjusting the pH of the solid protein curd fraction of step (d) to a pH selected from between about 5.5 to 7.0, and adding the solid protein curd fraction to the insoluble turkey meat protein fraction of step (b) to form a turkey meat protein product;

f) adding a nitrogen oxide generating compound to said solution-phase pigment fraction of step (d), thereby denaturing the myoglobin pigment in the solution-phase myoglobin pigment fraction;

g) filtering the denatured myoglobin pigment of step (f) to form a meat myoglobin pigment cake and a residual saline solution; and h) drying and milling the meat pigment cake of step (g) to form a powder, and recycling the residual saline solution of step (g) to step (a).

Step a) of this embodiment of the invention contemplates contacting turkey meat by-products with saline having an ionic strength between about 0.1 to 0.9, preferably about 0.17 to about 0.86, under conditions suitable to form a solid-phase fraction and a solution-phase fraction, wherein the solid-phase fraction contains insoluble turkey meat muscle protein, and wherein the solution-phase fraction contains soluble turkey meat muscle protein and myoglobin pigment.

As used herein, the phrase "soluble turkey meat muscle protein" refers to meat muscle proteins that are soluble in an aqueous salt solution, preferably a salt solution of at least about 1-5% by weight salt concentration, which correlates to an ionic strength of about 0.1-0.9. The phrase "myoglobin pigment" refers to the brownish-red pigment that is contained in the "dark meat" of a variety of animals, e.g., beef, poultry and fish.

As used herein, "conditions suitable to form a solid-phase fraction and a solution-phase fraction" refers to the addition of salt into a contacting means (e.g., mixer) to a final concentration of about 1.5 to 5% preferably about 2.0% (w/w). The contacting step can either be accomplished slowly or by vigorous mixing, e.g., employing a high shearing mixer. More of the salt soluble protein is extracted if the contacting step employs vigorous mixing for an extended period of time (e.g., similar to the mixing obtained in a Hobart mixer for about 30-60 minutes at low speed or other high shear mixing apparatus). The extraction step is usually instantaneous if there is enough salt (e.g., at least 1%) in the solution and the muscle cell membrane has been broken. Those of skill in the art will recognize that the time required for protein extraction will vary depending on the sheer pressure and salt concentration utilized.

The extracted protein increases the viscosity of the saline solution. Extraction of salt soluble proteins can be monitored visually to determine the extent of meat muscle remaining attached to the bones during the mixing. The temperature during the extraction step is preferably kept at or below 40° F. however the extraction will still be complete at higher temperatures, so long as the temperature does not exceed the denaturation temperature (about 110° F.) of the muscle proteins.

Exemplary salts that may be employed for protein extraction include sodium and potassium chlorides, and sodium and potassium salts of such acids as phosphoric acid, and its derivatives, lactic acid, citric acid, adipic acid, ascorbic acid, tartaric acid, acetic acid, malic acid, succinic acid, glucono delta-lactone, benzoic acid, erythorbic acid, propionic acid, sorbic acid, and the like.

Step b) of this embodiment of the invention contemplates separating the solid-phase fraction of step (a) from the solution-phase fraction of step (a).

With respect to the separation contemplated by step (b), the solution-phase fraction (containing soluble meat muscle protein and myoglobin pigment) can be separated from the solid-phase fraction, and also from a fat-fraction that forms separately, by a three-phase centrifuge, such as one commercially available from Alfa Laval Co. (Greenwood, Ind.). The centrifuge can be operated in the range of about 1,000-10,000 g-force, preferably in the range of about 1,500-3,000, with a g-force of 3,000 being especially preferred. The feed rate of the animal by-product starting material is such that the residence time of the carcass by-products being separated is typically about 30 minutes, although this rate may be varied accordingly by those of skill in the art. The fat-fraction, which forms the top layer within the centrifuge, is removed from the solution-phase and solid-phase fractions by decanting or skimming. The solution-phase and the solid-phase are each independently discharged by the centrifuge and collected for further processing.

This separation step contemplated by step (b) can also be accomplished by other well-known separation devices, e.g., a combination of a screen filter, such as the one produced by Sweco (Florence, Ky.), and a two phase centrifuge, and the like. It is preferable to keep the temperature during screening close to 32° F. to facilitate the separation of fat from the protein solution.

In one embodiment of the invention method, the residual fat in the meat muscle protein-containing solution-phase fraction (typically $\leq 2.5\%$) can be further reduced such that the meat muscle protein in the solution-phase fraction has substantially no fat, i.e., a fat content of about 0% up to about 1%. This fat reduction can be accomplished employing an appropriate filtration system, such as the microfiltration system available from Separation Technology (Clemenson, S.C.) or other filtration technology well known in the art. This can also be accomplished employing a two phase centrifuge wherein the temperature of the meat muscle protein-containing solution-phase fraction can be increased up to about 110° F., so long as the protein is not denatured. However, if substantially no fat content in the protein is not desired, further separation of fat is not necessary.

When filtering using a stainless filtration tube made by the sintering process, the protein solution is preferably kept near the freezing point to solidify the fat and break the emulsion. The protein solution is circulated through the sintered stainless filtration tube with a controlled pressure, flux, and pore size to allow protein to pass through the tube. Fat is retained and concentrated in the tube due to its hydrophobic property.

Step c) of this embodiment of the invention contemplates adjusting the pH of the solution-phase fraction to the isoelectric point of the meat muscle protein so as to precipitate the soluble meat muscle protein in the solution-phase fraction obtained from step (b), thereby forming a meat muscle protein curd fraction, and a solution-phase fraction containing myoglobin pigment.

With respect to the precipitation contemplated by step (c), the protein solution is pumped into a mixing tank and the pH is adjusted to the isoelectric point. Since the solution consists of several proteins, the isoeletric pH may be variably adjusted for the precipitation of different proteins. The different meat muscle proteins contained in the solution-phase fraction of step (b) are collectively referred to herein as "protein". After the protein is precipitated in the form of a solid protein curd, the solution is pumped to a suitable means for separation, preferably a centrifuge, and the protein is separated from the liquid.

The isoelectric pH employed herein can be a single value (e.g., pH=5.2) or a range of pH values, such as from pH 4.0 up to about pH 6.0, based on the protein in the solution. Exemplary acids for use in adjusting the pH to the isoelectric point include hydrochloric acid, phosphoric acid, lactic acid, citric acid, ascorbic acid, tartaric acid, acetic acid, malic acid, succinic acid, erythorbic acid, propionic acid, sorbic acid, and the like.

Step d) of this embodiment of the invention contemplates separating the meat muscle protein curd fraction of step (c) from the solution-phase myoglobin pigment fraction.

The separation of solution-phase myoglobin pigment fraction from the solid meat muscle protein curd fraction can be accomplished by well known methods, such as using a filter press and membrane filter or a centrifuge. For example, when employing a centrifuge, the solid protein curd is discharged as a solid phase from the centrifuge and the saline solution (which also consists of myoglobin pigment from muscle) is discharged as a liquid phase.

Step e) of this embodiment of the invention contemplates adjusting the pH of the solid protein curd fraction of step (d) to a pH selected from between about 5.5 to 7.0 to redissolve the salt soluble protein, and adding the redissolved salt soluble protein to the insoluble turkey meat protein fraction of step (b) to form a turkey meat protein product.

The pH of the solid protein curd fraction separated by the centrifuge is adjusted away from the isoelectric pH to between about 5.5 to 7.0, preferably to a pH of about 6.2. This procedure redissolves the protein in the saline solution, and significantly increases the viscosity of the saline solution. During this step vigorous mixing is preferred to ensure a protein product with uniform pH and consistency. The pH of the protein curd can be adjusted, for example, with alkaline bases such as sodium hydroxide, potassium hydroxide, ammonium hydroxide, magnesium hydroxide, calcium hydroxide, and the like.

The salt soluble meat-derived protein is added to the salt insoluble meat protein obtained from step (b) to form a turkey meat-derived protein product that can be used as is, or frozen and later thawed for use as a meat protein source. The protein is very low in fat and cholesterol content. For example, the meat muscle protein produced by the invention methods has a fat content in the range of 0 up to about 1% and a cholesterol content in the rage of 0 up to about 10 mg per 100 grams of protein curd. The protein can be used in processed meat, poultry and turkey formulations to improve the emulsion stability, water binding, cook and chill yield, fat emulsification, and gelling properties of these products. Use of this protein as a meat substitute also decreases the cost of food formulations and provides nutritional value without the disadvantage of animal fat and cholesterol.

Step f) of this embodiment of the invention contemplates adding a nitrogen oxide generating compound to the solution-phase pigment fraction of step (d), thereby denaturing the myoglobin pigment in the solution-phase myoglobin pigment fraction.

The pigment contained in the solution fraction can be treated by numerous methods well known for denaturing (oxidizing) myoglobin, such as by heating and/or by adding nitrite (such as sodium nitrite, and the like), nitrates or injecting nitrogen oxide into the solution to convert the pigment to nitrosomyoglobin. A combination of heating and adding nitrite, nitrate or nitrogen oxide treatment to denature the myoglobin pigment is preferably employed. The myoglobin containing solution can be used directly for processing food products (such as, for example, processed meat and poultry products), or the myoglobin can be further isolated in the form of a meat pigment cake. The oxidized nitrosomyoglobin obtained has the desirable property of being stabilized with respect to color (i.e., not being susceptible to color change).

In a preferred embodiment, the myoglobin pigment is denatured by adjusting the pH to about 7.0. Sodium nitrite is then added, preferably to a level of not more than about 52 ppm. The solution is then mixed, heated to a temperature of at least 158° F. or higher, and filtered through a filter press. As a result, the residual saline solution is pasteurized.

Step g) of this embodiment of the invention contemplates filtering the denatured myoglobin pigment of step (f) to form a meat myoglobin pigment cake and a residual saline solution.

This filtration step can be accomplished employing a filter press or any similar filtration apparatus well known in the art. The filtrate from the solution-phase pigment fraction is a pasteurized salt (brine) solution, which is recycled back to the beginning of the protein extraction process (i.e., step b), after adjusting the saline solution to a salt concentration of about 1–5% (i.e., an ionic strength of about 0.1–0.9), preferably about 2%.

Step h) of this embodiment of the invention contemplates drying and milling the meat pigment cake of step (g) to form a myoglobin pigment powder, and recycling the residual saline solution of step (g) to step (a).

Methods of drying and milling the meat myoglobin pigment cake are well known in the art. The filtered meat myoglobin pigment (in the form of a pink protein solid) is dried using a drum drier or other available means, such as vacuum pan drying and spray drying, and is useful thereafter as meat pigment, such as for adding to soy protein to increase its cure meat pigment color.

In accordance with another embodiment of the present invention, there is provided a meat muscle protein composition. The invention meat muscle protein composition can be produced by any of the methods described above. The meat muscle protein composition is characterized by having substantially no fat and substantially no cholesterol. Preferably, the invention meat muscle protein composition is substantially free of denatured protein.

As used herein, the phrase "substantially no fat" refers to invention meat muscle protein compositions that contain from 0% up to about 5% fat content, preferably 0% up to about 3% fat content, with less than about 1% fat content being especially preferred.

As used herein, the phrase "substantially no cholesterol" refers to invention meat muscle protein compositions that contain from 0 up to about 100 mg cholesterol, preferably 0 up to about 50 mg cholesterol, per 100 g protein, with less than about 10 mg cholesterol/100 g protein being especially preferred.

As used herein, "substantially free of denatured protein" refers to meat muscle protein isolated by the method described herein. Such meat muscle protein does not contain a significant amount of denatured protein that typically occurs when deboned animal meat is subjected to temperatures above 110° F. In other words, the proteins in the meat composition produced herein have substantially the same tertiary structures as the meat muscle proteins in the respective deboned raw meat starting material.

The improved functional properties of the meat muscle protein composition include, for example, lower fat and cholesterol content and increased gelling properties. The improved functional properties are useful in the formulation and further processing of meat products.

Invention meat muscle protein compositions can be used, employing methods well-known in the art, in any composition that requires a low fat, low cholesterol, high quality protein source. For example, the invention meat muscle protein composition can be used in a variety of food products, such as processed meat, poultry, or fish products (e.g., hot dogs, dry or semi-dry sausages), health foods, snack foods (e.g., baked high protein-type snack products), protein drinks, and the like.

In accordance with yet another embodiment of the present invention, there are provided food products comprising the invention meat muscle protein compositions described herein. For example, as discussed above, the invention meat muscle protein composition can be used in a variety of food products, such as processed meat, poultry, or fish products (e.g., hot dogs, dry or semi-dry sausages, and bologna), health foods, snack foods (e.g., baked high protein-type snack products), protein drinks, and the like. The invention food products are prepared by methods well-known in the art (see, e.g., U.S. Pat. No. 4,844,922; U.S. Pat. No. 4,876,103; U.S. Pat. No. 4,504,515; and the like).

Invention food products containing the meat muscle protein compositions produced herein suffer no more processing losses in cook shrink and slicing yield than non-invention products having the same fat content made from non-invention raw materials. Also, food products containing the invention meat muscle protein compositions have substantially similar sensory profiles and organoleptic properties compared to meat products made with conventional low fat high cost raw materials.

It is important to design a product formula, e.g., bologna, so that the protein to water ratio is sufficiently optimized to give desirable yield and/or texture, as well as other required characteristics of finished product. It is possible to replace either part or all of very expensive lean meats in the product formula with the low cost, low fat, invention meat muscle protein, and still produce a composition having good meat functionality.

For example, in one embodiment, an invention bologna food product containing about 3.0% fat was compared with a conventional low fat (3% fat) bologna with respect to texture, cook and chill yield, and other organoleptic properties. Both the conventional and invention bologna had comparable texture, and a cook and chill yield of 93%. However, invention food product had a lighter color and was closer to the color of regular all meat bologna.

OPERATION

In operation, the method of making functional and natural meat muscle protein, meat muscle pigment, broth, animal fat and bone meal from animal carcass by-products, operates as depicted in FIGS. 1 and 2. For example, bone-residues from frames of beef, pork, poultry or turkey previously processed in a mechanical meat separator are scaled and batched as starting raw materials for the invention method. Raw material is ground, pulverized and mixed with a brine (salt) solution to extract the protein. The suspension of bone material is pumped through, for example, a three phase centrifuge to separate the protein solution from bone, connective tissue and fat (solid-phase). Bone, connective tissue and fat are collected and further processed as illustrated in FIG. 2. The soluble protein solution is pumped as a solution-phase into a holding tank equipped with a mixing apparatus. Acid is added to the protein solution in a tank equipped with a mixing arm to precipitate the protein and form a protein curd. The protein curd is separated by centrifuge from the brine solution containing myoglobin pigment. The pH of the solid protein curd is adjusted back to natural pH with, for example, sodium hydroxide or other alkali. The resulting protein product may be packaged and chilled for later use in the formulation of food products. The brine solution phase obtained from the centrifugation step is cooked by a heat exchanger to denature the pigment and pasteurize the brine. The brine solution is then passed through a filter press or other filtration apparatus to separate the solid pigment from the brine, thereby forming a myoglobin pigment cake. The pigment cake is dried and milled. The brine solution is adjusted for salt content and recycled to the brine holding tank for reuse in the protein extraction step.

The bone, fat and connective tissue collected from the three phase centrifuge are cooked with water under pressure (FIG. 2). The pH within the pressure cooker is optionally adjusted with acid down to 4.2 or below. After pressure cooking, a screen filter, or the like, is employed to separate the broth and fat from the bone. The bone is dried, milled and packaged as bone-meal. The broth and fat are further separated from each other. The fat is refined. The broth is treated by an evaporator for concentration to a desirable solid content. The broth is then neutralized by alkali, chilled and packaged.

In operation, the method of making natural turkey meat protein and turkey myoglobin pigment from turkey meat by-products operates as depicted in FIG. 3. For example, mechanically deboned turkey meat or ground turkey dark meat is mixed with a salt solution by a mixer. The mixture is centrifuged to separate each of the fat, liquid with salt soluble protein, and the solid phase salt insoluble protein residue, from each other. The pH of salt soluble protein liquid fraction is adjusted, e.g., to pH 5.2, to precipitate the protein. The precipitated protein is separated from the myoglobin containing salt solution. Sodium hydroxide or other alkali is added into the salt soluble protein to raise the pH, e.g., up to about 6.2. This salt soluble protein is added to the solid phase of salt insoluble protein residue, mixed, chilled and packaged. The myoglobin containing salt solution goes through the same process as depicted in FIG. 1, and as described above, to recover the myoglobin and brine solution.

The invention will now be described in greater detail by reference to the following non-limiting examples.

EXAMPLE 1

Turkey bone by-products recovered from a mechanical de-boning machine (Beehive Machinery Inc., Sandy, Utah) were maintained at a temperature of less than 60° F. and then packaged and frozen for later use as raw starting materials. Next, 500 lbs. of the frozen bone by-products were sliced with a hydroflaker into thin flakes. The bone flakes were transferred to a high shear mixer manufactured by Breddo Likwifier (American Ingredients Co., Kansas City, Kans.). Nine hundred and seventy pounds of water and 30 pounds of salt were added to the Breddo Likwifier and mixed for three minutes while recirculating the mixture through a by-pass. Cold water was circulated in the jacketed mixer to keep the temperature under 40° F. After mixing, the mixture had a uniform consistency and was viscous indicating the salt soluble muscle protein had dissolved in the solution. This mixture was pumped at a feed rate of 5,000 lbs./hr to a three phase centrifuge (manufactured by Alfa Laval, Greenwood, Ind.) operating at about 3,000 g-force, to separate bone solids, fat as light phase and protein solution as heavy phase.

The protein solution phase was collected and transferred to a Breddo Likwifier. Ten normal hydrochloric acid was added to adjust the pH to 5.2 and gently mixed to completely precipitate the protein from the solution, thereby forming a solid protein curd. The protein curd solution was further pumped through a three phase centrifuge to separate the solid protein curd from the liquid-phase. The protein discharged from the centrifuge as a solid phase had very little water holding property and fat content. The protein was transferred to a Breddo Likwifier (Kansas City, Kans.) and 3.0N sodium hydroxide was added to adjust pH to 6.2 while mixing. The protein dissolved again in the water as the pH approached 6.2 and the water holding property and viscosity of the protein increased significantly. The muscle-derived salt soluble protein produced had a white color without having any red pigment color that is characteristic of dark meat in poultry and turkey meat. Throughout the above-described process, the temperature of the protein was maintained below 60° F. The meat muscle turkey protein, which has a 10% protein content and 2.2% salt content, was packaged and frozen for later use.

The turkey protein with 10% protein content and 2.2% salt was formulated into bologna with a 3% fat target. The bologna formulations contained the following compositions set forth in pounds:

TABLE 1

| FORMULA | CONTROL # | TEST # |
|---|---|---|
| Pork picnic cushion | 14.8 | 14.8 |
| Water | 7.8 | 5.6 |
| Turkey 95% lean | 3.00 | 3.0 |
| Beef 100% lean | 2.0 | 0.0 |
| Turkey protein | 0.0 | 4.2 |
| Commercial spice | 6.9 | 6.9 |
| Salt | 0.57 | 0.45 |
| Sodium nitrite | 0.003 | 0.003 |
| Total | 35.073 | 34.953 |

The control and test bologna formulations were produced employing standard commercial procedures. Meat, water and spice were batched, chopped for four minutes with vacuum, stuffed, cooked to an internal temperature of 162° F. and chilled to 40° F. before the evaluation. Both control and test formulations had similar texture, and a cook and chill yield of 93%. However, test product had a lighter color and was closer to the color of regular all meat bologna.

EXAMPLE 2

Eighty pounds of turkey bone by-products from mechanically deboned turkey was mixed with 155.2 pounds of water and 4.8 pounds of salt to arrive at a final salt concentration of 2%. The salt mixture was placed in a kettle (model# 40D9MT, Lee Industry, Phillipsburg, Pa.) equipped with two mixing arms for one hour. The solid-phase bone and fat containing fraction was collected by separating it from the solution-phase containing salt soluble muscle protein using a screen filter. Ten pounds of water was added to 5 pounds of the solid-phase residue. The pH of the mixture was adjusted to 3.8 with 3N hydrochloric acid, and the mixture was cooked in a pressure cooker at 250° F. and 25 psi for 15 minutes. After pressure cooking, the resulting broth was cooled to 180° F. and filtered through a filter cloth. The fat in the broth was further separated from the broth by gravity. The resulting broth had a clean and bland flavor profile. The broth was then concentrated to 15.8% protein content by a vacuum evaporator at a temperature of 122° F. The gelling properties of the resulting broth are shown in Table 2. The "+" indicates formation of a gel, "−" indicates no formation of a gel, and "+/−" indicates that the broth may or may not form the gel.

TABLE 2

| TEST | BROTH (ml) | WATER (ml) | PROTEIN (%) | GEL[1] (77° F.) | GEL (40° F.) |
|---|---|---|---|---|---|
| 1 | 30 | 0 | 15.8 | + | + |
| 2 | 20 | 10 | 10.5 | + | + |
| 3 | 15 | 15 | 7.4 | + | + |
| 4 | 10 | 20 | 5.3 | + | + |
| 5 | 5 | 25 | 2.6 | ± | + |
| 6 | 2.5 | 27.5 | 1.32 | − | + |
| 7 | 2 | 28 | 1.05 | − | + |
| 8 | 1 | 29 | 0.005 | − | − |

EXAMPLE 3

Fat separated from the broth described above in Example 2 was filtered through a filter cloth. The moisture was removed under vacuum at 122° F. in a laboratory glass evaporator. The finished fat has a clean flavor note and clear yellowish color typical of turkey fat.

EXAMPLE 4

The bone residue from Example 2 was dried in an oven and milled to a fine bone-meal powder. The composition of the resulting bone-meal is shown in Table 3, with percentages given as weight percents.

TABLE 3

| % Prot. | % Fat | % Mois. | % Ash | % Carbo | % Salt | Na mg/ 100 g | K mg/ 100 g | CA mg/ 100 g |
|---|---|---|---|---|---|---|---|---|
| 34.3 | 19.6 | 2.3 | 43.8 | 0 | 0.47 | 6 | 109 | 15038 |

EXAMPLE 5

Turkey bone frame raw starting materials were ground twice in a grinder (The Biro Mfg. Co., Marblehead, Ohio) to a final particle size of 3/32". Ten pounds of ground bones, 0.9 pounds of salt and 19.1 pounds of water were added to a high shear mixer (Scott Turbon Mixer, Inc., Sun Valley, Calif.). The temperature of the mixture was kept under 40° F. with dry ice. After 20 minutes of mixing, the mixture was transferred to centrifugal tubes and centrifuged at 3,000 g for 10 minutes. The salt soluble protein fraction was decanted into a beaker. The pH of the soluble protein solution was adjusted to 5.2 with 3.0 N hydrochloric acid to precipitate the protein. Precipitated salt soluble protein was further separated by centrifugation for 5 minutes at 3,000 g and then collected. The residual salt solution containing red meat myoglobin pigment was transferred to a beaker for use in producing myoglobin pigment cake as described in Example 6. The soluble protein at this stage has no color and very poor water holding ability. The pH of the salt soluble protein was adjusted to 6.2 with 2.5N sodium hydroxide solution, thereby increasing the protein's water holding property significantly. The protein's resulting chemical composition comprises 6.8% protein 2.8% fat, 3% salt and 86.1% water.

The protein product was used to make the frankfurter formulation shown in Table 4, with the ingredients set forth in pounds.

TABLE 4

| FORMULA | TEST (lbs) |
|---|---|
| Pork picnic cushion | 13.81 |
| Water | 8.15 |
| Turkey thigh meat | 2.97 |
| Turkey protein (6.8% protein) | 4.44 |
| Commercial spice | 8.23 |
| Salt | 0.22 |
| Sodium Nitrite | 0.003 |
| Total | 37.823 |
| Cook and chill yield | 91 |

The resulting frankfurter product had good frankfurter texture and flavor. The loss from cooking and chilling is 9% (i.e., cook and chill yield is 91%) which is typical for frankfurter production.

EXAMPLE 6

Mechanically deboned turkey meat in the amount of 500 grams was mixed with 40 grams of salt and 1460 grams of water in a Hobart mixer (model D-3000, Hobart Mfg. Co., Troy, Ohio) for 30 minutes at a refrigerated temperature of 40° F. The mixture was centrifuged at 3000 g for 10 minutes to separate the fat, salt soluble protein and salt insoluble protein residues from each other. The fat was decanted and each of the salt soluble protein and insoluble protein residual fractions were separately collected. Hydrochloric acid (3.0N) was added to salt soluble protein fraction until its pH reached 5.2 to form a protein curd. The protein curd formed in the salt soluble protein fraction was centrifuged and separated from a clear brine pigment solution. The clear brine pigment solution was decanted into a beaker. Sodium nitrite was added, at 38 ppm, to the brine pigment solution, mixed for 15 minutes and heated to 160° F. The pigment myoglobin was converted to a pink cure meat pigment, and filtered through a Whatman number 40 paper filter (Whatman Limited, London, England). The pink protein with myoglobin was retained on the filter paper. The filtrate was clear and did not contain any myoglobin. This cured meat pigment was added to isolated soy protein to increase its cure meat pigment color.

EXAMPLE 7

Mechanically deboned turkey meat in the amount of 2.2 pounds, 0.176 pounds of salt, and 6.424 pounds of water were mixed in a Hobart mixer for 30 minutes at low speed mixing. The mixture was centrifuged for 10 minutes at 3,000 g. The top layer of the centrifuge tube containing fat was removed. The remaining liquid fraction was decanted from the salt insoluble meat protein residue. The pH of the liquid fraction was adjusted to 5.2 with 3.0N hydrochloric acid to precipitate the salt-soluble protein, and was then centrifuged. The salt soluble protein was separated from the remaining liquid fraction that contains myoglobin pigment. The liquid fraction was decanted and the salt soluble protein was collected. The chemical compositions (given in weight %) of the salt insoluble meat residue, salt soluble proteins and liquid fraction with myoglobin are shown in Table 5.

TABLE 5

| PRODUCT | PROTEIN (%) | FAT (%) | MOISTURE (%) | SALT (%) |
|---|---|---|---|---|
| MDTM | 19.2 | 12.0 | 67.5 | — |
| SIPR | 14.1 | 3.3 | 79.5 | 1.73 |
| ML | 1.7 | 0 | 96.3 | 2.02 |
| SSP | 10.5 | 1.3 | 87.3 | 2.03 |

MDTM: Mechanic deboned turkey meat.
SIPR: Salt insoluble protein residue.
SSP: Salt soluble protein.
ML: Myoglobin liquid solution.

The pH of the myoglobin liquid solution was adjusted to 5.0, 5.5, 6.0, 6.5 and 7.0. Forty ppm of sodium nitrite was added to each sample, mixed for 30 minutes and heated to 162° F. on a hot plate. The heated solution was filtered through a Whatman filter (number 40) to form a nitroso-myoglobin fraction and a liquid filtrate fraction. The filtrates of each sample had the compositions shown in Table 6.

TABLE 6

| SAMPLE | Myoglobin (mg/100 ml) in sample | Myoglobin (mg/100 ml) in filtrate | Percent of myoglobin converted to nitroso-myoglobin |
|---|---|---|---|
| ML | 59.85 | — | — |
| pH 5.0 | 37.16 | 1.44 | 97.12 |
| pH 5.5 | 41.86 | 3.22 | 92.31 |
| pH 6.0 | 40.60 | 16.07 | 60.42 |
| pH 6.5 | 34.98 | 8.99 | 74.3 |
| pH 7.0 | 35.44 | 2.90 | 91.82 |

ML: Myoglobin liquid

The results in Table 6 indicate that greater than 90% of myoglobin can be converted to nitroso-myoglobin at pHs in the range of 5.0–7.0. The oxidized nitroso-myoglobin obtained has the desirable property of being stabilized with respect to color (i.e., not being susceptible to color change).

While the invention has been described in detail with reference to certain preferred embodiments thereof, it will be understood that modifications and variations are within the spirit and scope of that which is described and claimed.

That which is claimed is:

1. A method of making functional and natural meat muscle protein, meat muscle pigment, broth, animal fat and bone meal from animal carcass by-products, said method comprising:
   a) comminuting animal carcass by-products under conditions sufficient to break meat muscle cell membranes thereby releasing meat muscle protein;
   b) contacting the comminuted animal carcass by-products with saline having an ionic strength between about 0.1 to 0.9, under conditions suitable to form a solid-phase fraction and a solution-phase fraction, wherein said solid-phase fraction contains bone, fat, fat soluble organic materials, and connective tissue and said solution-phase fraction contains soluble meat muscle protein and myoglobin pigment;
   c) separating the solid-phase fraction of step (b) from the solution-phase fraction of step (b);
   d) adjusting the pH of the solution-phase fraction to the isoelectric point of said meat muscle protein so as to precipitate the soluble meat muscle protein in the solution-phase fraction of step (c), thereby forming a meat muscle protein curd fraction, and a solution-phase fraction containing myoglobin pigment;

e) separating the meat muscle protein curd fraction of step (d) from the solution-phase myoglobin pigment fraction;

f) adjusting the pH of the protein curd fraction of step (e) to a pH selected from between about 5.5 to 7.0 to form a meat muscle protein product, and adding a nitrogen oxide generating compound to said solution-phase pigment fraction of step (e), thereby denaturing the myoglobin pigment in the solution-phase myoglobin pigment fraction;

g) filtering the denatured myoglobin pigment of step (f) to form a meat myoglobin pigment cake and a residual saline solution;

h) drying and milling the meat pigment cake of step (g) to form a powder, and recycling the residual saline solution of step (g) to step (b);

i) cooking the solid-phase fraction of step (c) under conditions sufficient to convert substantially all connective tissue in said fraction into soluble collagen, thereby forming a broth-fat fraction and a bone-residue fraction;

j) drying and milling the bone-residue fraction of step (i) to form a bone-meal;

k) separating the broth-fat fraction of step (i) into fat and broth fractions;

l) refining the fat of step (k) to produce a fat-product; and m) concentrating the broth of step (k) to form a broth-product.

2. The method according to claim 1, wherein the comminuting of step (a) is done by grinder, pulverizer or colloid mill.

3. The method according to claim 1, wherein the animal carcass by-products of step (a) are comminuted to fragments having an average diameter of 3/32".

4. The method according to claim 1, wherein the animal carcass by-products of step (a) are selected from the group consisting of turkey, chicken, pork, beef, duck and fish.

5. The method according to claim 1, wherein the separation in step (c) is carried out at about 32° F.

6. The method according to claim 1, wherein the separation in step (c) is achieved with a three-phase centrifuge.

7. The method according to claim 1, wherein the meat muscle protein in the solution-phase fraction of step (c) has substantially no residual fat after separation.

8. The method according to claim 1, wherein the isoelectric point of step (d) is adjusted in the range of about pH 4.0 up to pH of about 6.0.

9. The method according to claim 1, wherein the meat muscle protein product has a fat content in the range of 0 up to about 1% and a cholesterol content in the range of 0 up to about 10 mg/100 g.

10. The method according to claim 1, wherein the nitrogen oxide generating compound of step (f) is sodium nitrite.

11. The method according to claim 1, wherein the broth-product of step (m) gels at room temperature with a 3% solid content.

12. The method according to claim 1, wherein the broth-fat fraction and the bone-residue fraction of step (i) are separated with a screen filter or centrifuge.

13. The method according to claim 1, wherein the separation of step (k) is achieved by centrifugation or decanting.

14. The method according to claim 1, wherein the broth of step (m) is concentrated by evaporating, neutralizing the pH and chilling said broth.

15. The method according to claim 1, wherein the refining of step (l) is achieved by subjecting the fat of step (k) to dewatering, deodorizing, filtering and chilling.

16. A method of making natural turkey meat protein and turkey myoglobin pigment from turkey meat by-products, said method comprising:

a) contacting turkey meat by-products with saline having an ionic strength between about 0.1 to 0.9, under conditions suitable to form a solid-phase fraction and a solution-phase fraction, wherein said solid-phase fraction contains insoluble turkey meat muscle protein, and wherein said solution-phase fraction contains soluble turkey meat muscle protein and myoglobin pigment;

b) separating the solid-phase fraction of step (a) from the solution-phase fraction of step (a);

c) adjusting the pH of the solution-phase fraction to the isoelectric point of said meat muscle protein so as to precipitate the soluble meat muscle protein in the solution-phase fraction of step (b), thereby forming a meat muscle protein curd fraction, and a solution-phase fraction containing myoglobin pigment;

d) separating the meat muscle protein curd fraction of step (c) from the solution-phase myoglobin pigment fraction;

e) adjusting the pH of the solid protein curd fraction of step (d) to a pH selected from between about 5.5 to 7.0, and then adding the protein curd fraction to the insoluble turkey meat protein fraction of step (b) to form a turkey meat protein product;

f) adding a nitrogen oxide generating compound to said solution-phase pigment fraction of step (d), thereby denaturing the myoglobin pigment in the solution-phase myoglobin pigment fraction;

g) filtering the denatured myoglobin pigment of step (f) to form a meat myoglobin pigment cake and a residual saline solution; and h) drying and milling the meat pigment cake of step (g) to form a powder, and recycling the residual saline solution of step (g) to step (a).

* * * * *